(12) United States Patent
Jamison et al.

(10) Patent No.: US 10,447,677 B1
(45) Date of Patent: Oct. 15, 2019

(54) MOBILE APPLICATION AUTHENTICATION INFRASTRUCTURE

(71) Applicant: United Services Automobile Association (USAA), San Antonio, TX (US)

(72) Inventors: Andrew P. Jamison, San Antonio, TX (US); Jared Anthony Bluntzer, San Antonio, TX (US); Dallin Clarence Wilcox, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 183 days.

(21) Appl. No.: 14/586,442

(22) Filed: Dec. 30, 2014

Related U.S. Application Data

(60) Provisional application No. 61/953,560, filed on Mar. 14, 2014.

(51) Int. Cl.
*H04L 29/06* (2006.01)

(52) U.S. Cl.
CPC .................. *H04L 63/08* (2013.01)

(58) Field of Classification Search
None
See application file for complete search history.

(56) References Cited

U.S. PATENT DOCUMENTS

| | | | |
|---|---|---|---|
| 9,430,624 B1* | 8/2016 | Mortensen | G06F 21/31 |
| 2003/0225703 A1* | 12/2003 | Angel | G06Q 20/382 |
| | | | 705/64 |
| 2005/0240428 A1* | 10/2005 | Gabrick | G06Q 50/184 |
| | | | 705/310 |
| 2008/0066165 A1* | 3/2008 | Rosenoer | G06F 17/30569 |
| | | | 726/5 |
| 2009/0292927 A1* | 11/2009 | Wenzel | G06F 21/41 |
| | | | 713/185 |
| 2010/0158233 A1* | 6/2010 | Caceres | H04M 3/436 |
| | | | 379/207.02 |
| 2012/0214442 A1* | 8/2012 | Crawford | H04W 12/06 |
| | | | 455/411 |
| 2014/0068730 A1* | 3/2014 | Hamilton, II | G06F 21/41 |
| | | | 726/5 |
| 2015/0244701 A1* | 8/2015 | Hamilton, II | G06F 21/41 |
| | | | 726/5 |

* cited by examiner

*Primary Examiner* — Michael R Vaughan
(74) *Attorney, Agent, or Firm* — Perkins Coie LLP

(57) ABSTRACT

Various embodiments of the present technology generally relate to authentication. More specifically, some embodiments relate to systems and methods for mobile application infrastructure and framework for application authentication. Currently, methods and systems for authentication are not flexible or dynamic and over-authentication has become a solution because it is cheap and easy. In contrast, in accordance with some embodiments of this application, the methods and systems can analyze authentication challenges and non-authentication challenges received from a server over a network in a client side infrastructure. The client side infrastructure can determine a customized, flexible, and dynamic plan for responding to authentication challenges in manner that avoids over-authentication on the client side.

22 Claims, 9 Drawing Sheets

MOBILE APPLICATION AUTHENTICATION INFRASTRUCTURE

CROSS-REFERENCE TO RELATED APPLICATION(S)

The present application claims priority to U.S. Provisional Application No. 61/953,560, filed Mar. 14, 2014, entitled Mobile Application Infrastructure, which is herein incorporated by reference in its entirety for all purposes.

TECHNICAL FIELD

Various embodiments of the present technology generally relate to authentication. More specifically, some embodiments relate to a mobile application infrastructure and framework for application authentication.

BACKGROUND

Organizations strive to ensure secure and convenient user access to services or accounts. With the proliferation of identity theft and the growing emphasis on convenience, organizations are forced to find a balance between gathering enough identifying information and making the services or accounts accessible to users. Regulations and business rules may also govern how much or the types of identifying information the user must provide depending upon the nature of the activity that is requested.

Existing systems often sacrifice security for convenience or sacrifice convenience for security. For example, users may be required to provide a login, password, and answer a secret question simply to engage in a low risk activity (e.g., to view current interest rates). Thus, although the user may be engaging in a low-risk activity, the user may be required to provide an excessive amount of information thereby sacrificing convenience for security.

BRIEF DESCRIPTION OF THE DRAWINGS

Embodiments of the present technology will be described and explained through the use of the accompanying drawings in which.

Figure 1:
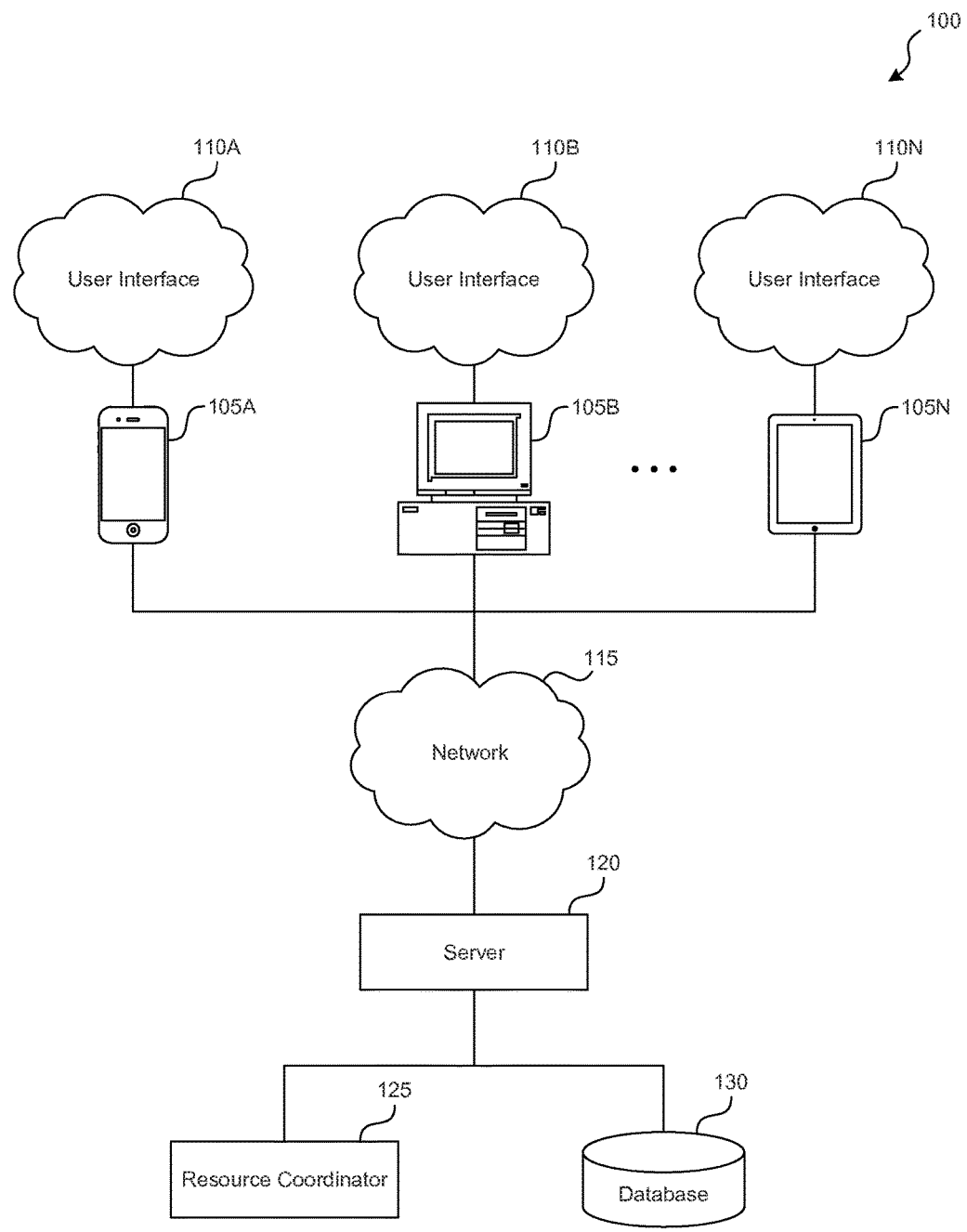
FIG. 1 illustrates an example of a networked-based environment in which some embodiments of the present technology may be utilized.

The drawings are not to scale. For example, the dimensions of some of the elements in the figures may be expanded or reduced to help improve the understanding of the embodiments of the present technology. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to authentication. In particular, some embodiments relate to systems and methods for a mobile application infrastructure and framework. Many traditional authentication techniques may be characterized by one entity sending an authentication challenge (e.g., a request or query) to another entity (e.g., a person, client, server machine, device, or thing that can communicate over a network). In response to receiving the authentication challenge, the second entity must respond with the appropriate answer to be authenticated and granted access to a service or data. Authentication ensures that communications are being sent to the correct entity. Moreover, various communications between entities may be secured to protect from additional security risks.

In password authentication, for example, the challenge may be a request from a server asking the client for a password to authenticate the client's identity in order to serve the client. For instance, when a person desires to check their bank account balance using a mobile device or computer, the client sends a request over a network to the bank's server. The bank's server responds to the client with a question for the user's name and password. If the user enters and sends the correct name and password to the server, the server will respond with the user's account balance. If the user enters the incorrect name or password, the server will deny the request to access the user's account balance.

Another example of authentication is a biometric authentication. A user can request confidential information from a server. The server may respond with a request for the user's fingerprint before sending the confidential information. The user can then send his or her fingerprint to the server. If the server verifies that the fingerprint belongs to the user, the server has authenticated the communication and may now send the user information. If the server cannot verify that the fingerprint belongs to the user, they server may deny the request for information.

Password authentication and biometric authentication are examples of active authentication. However, there a variety of passive techniques that can be used as part of the authentication process. Passive techniques are typically non-invasive to the user and typically include requests the user does not see (e.g., for information from a user's device). For example, a server may request a user's location or software version of a user's mobile device before sending information to the user. However, these requests are neither viewed by the user nor require a direct response form the user. Rather, the client and server handle the request and answer automatically and may only alert the user if there is a problem.

The communications between two entities may contain requests for information or data that have varying levels of sensitivity. As a result, the communications may vary in the assurance level of authentication that is needed. Assurance level requirements of authentication in communications can range from little or no confidence in user authentication to a very high confidence level of authentication. For example, communications involving a user's bank account balance may require a higher assurance level of authentication than a request for a new webpage. Still yet, a request to transfer money from one account to another may require an even higher assurance level than a request to display a user's account balance. The varying levels of authentication assurance and numerous authentication challenges presented to the user can allow secure communications.

However, while authentication can be used to identify entities and in securing communications, there are currently several problems with how authentication challenges are handled on the client side. Specifically, current authentication systems are not dynamic, flexible, or adaptable. Rather, the current authentication challenge systems handle each challenge iteratively without creating a plan for how to respond to numerous authentication challenges with varying levels of authentication. This forces users to communicate with servers excessively, and it also requires the user to respond to authentication challenges an excessive amount of times. For example, by not creating a plan for authentication, a client and server may process authentication over several steps when it could instead be answered with one challenge.

These iterative processes, termed over-authentication, have become the status quo of the industry. Over-authentication does not require flexibility or adaptation; rather, the over-authentication processes respond to challenges in order without planning or considering alternatives to excessive authentication. Furthermore, current solutions extensively use server side protected resources without considering authentication solutions on the client side. In other words, the server side is creating and processing the authentication challenges while the client side just gathers user-input. This user-driven input system is an easy and cheap solution, but is also slow because of user-driven update cycles. Creating a seamless and efficient authentication method or process under the current system would require building, designing, and piecing together several different authentication methods and infrastructure on the client side.

In contrast, various embodiments of the present technology provide, for a mobile application authentication infrastructure, a holistic approach to authentication goals on the client side that allows for integration and implementation of customized authentication-based plans. Some embodiments include a client side framework consisting of a component for interpreting and translating server side authentication challenges into actionable client side authentication challenges, a component for coordinating the user interaction with multiple server-driven challenges, integration points between the coordination component and connectivity framework, a component for queueing authentication challenges and for holding authentication challenges, and a protocol for communication of specific challenges between the server and client. Various embodiments of the client side framework integrate the authentication components.

For example, suppose a user wants to inquire about financial information in a mobile application: a stock price, amount of shares owned for a particular stock, an account balance, and personal account information. The user will send these requests to a server, and the server will respond with authentication challenges (for the amount of shares owned, personal information, and account balance) and non-authentication challenges (stock price). The user's client side mobile application infrastructure, including a component for interpreting and translating, will interpret and translate the responses into challenges and non-challenges. The non-challenges (e.g., the stock price information) will not need authentication. As a result, the infrastructure can send the non-challenge information to the client (e.g., mobile application or browser). The infrastructure can then coordinate a plan for how to respond to the authentication challenges (e.g., determine when and how each challenge should be answered, such as by the user or internally without asking the challenge and whether or not a challenge should wait in the queue).

Some of the challenges may require user input (e.g., username and password for the stock shares) and other challenges may require different user input (e.g., a security question for the personal information). Based on the level assurance for the authentication, the infrastructure will determine a plan for how to efficiently ask the user and respond to the challenges. For example, if one challenge can be answered with another challenge, the infrastructure may queue one challenge and ask for user input on another challenge. Which challenges are queued and which challenges are presented to the user can be determined by a protocol. Furthermore, the user client side application can respond to the server challenges in an organized and efficient manner without having to change the authentication policy on the client side. The client will simply respond to the serve-side challenges, which does most of the authentication processing. Thus, the user will see the updated stock price, account balance, personal information, and amount of shares owned for a particular stock all at once, but the user will only need to respond to the highest level challenge or respond once instead of several times for each authentication challenge.

Consider the following case which integrates the client side authentication infrastructure. Suppose a user has several bank accounts and other confidential information stored on different servers. And suppose the user is using a mobile application running on a mobile device to access all this information at the same time. The mobile application aggregates the information. The screen of the mobile device can be divided into different sections to display different information corresponding to each account. Also, the screen could contain non-confidential information about the weather or bank, which does not need authentication. When the user requests to update this information, several requests will go to one or more servers. The server(s) will send responses that can typically be categorized into authentication challenges and non-authentication challenges. The mobile application will interpret and translate these authentication and non-authentication challenges. Non-authentication challenges can be sent directly to the user to update the requested information. The other authentication challenges will go through an authentication coordinator, which makes a plan for how to answer challenges.

Some embodiments provide for the flexible, dynamic, and authentication processing on the client side. As a result, repeated or excess authentication challenges can be eliminated or reduced while maintaining the same level of security. In addition, the amount of user inputs can be reduced. Furthermore, various embodiments of this flexible and dynamic authentication infrastructure provide a customized and holistic approach to address server responses on the client side. By addressing server responses on the client side, it allows all policy definition and enforcement to occur on the server side, which does not require a client side application update and reduces updating and excessive communication.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to the mobile application authentication infrastructure in isolation, embodiments of the present technology create a reusable authentication infrastructure that can be placed in any context on a screen to help clients handle server responses (e.g., in financial setting, a personal information or private information setting, in a database with confidential information, etc.). In addition, embodiments are equally applicable to various other authentication infrastructures within computer system.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

General Description

FIG. 1 illustrates an example of a networked-based environment 100 in which some embodiments of the present technology may be utilized. The embodiments illustrated in FIG. 1 show computing devices 105A-105N that can be any computing device capable of receiving user input as well as transmitting and/or receiving data via the network 115. Computing devices 105A-105N can also have user interfaces 105A-105N, which allow, for example, a user to use the computing devices. In one embodiment, computing devices 105A-105N may be a conventional computer system (e.g., a desktop or laptop computer) or a mobile device having computer functionality (e.g., a mobile telephone, a smartphone, wearable computer, etc.).

Examples of a user on computing devices 105A-105N include, but are not limited to, a membership organization, employee of a bank or a user of bank services on a mobile app, a credit union employee or patron, a credit card company employee or patron, a consumer finance company employee or patron or visitor, a diversified financial service group employee or visitor or patron, an insurance company, a user on his or her mobile device or personal computer, a user on his or her mobile device or personal computer using a mobile application or software program, and the like. Computing devices 105A-105N can execute a browser application or a customized client to enable interaction, using network 115, between the computing devices 105A-105N and server 120 for handling server responses.

Computing devices 105A-105N may be configured to use network 115 to communicate with server 120. In accordance with various embodiments, network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

In some embodiments, computing devices 105A-105N can retrieve or submit information to server 120. Server 120 can reply to the computing devices 105A-105N with several responses including authentication challenges and non-authentication challenges. Resource coordinator 125 may help coordinate and access information on the database 130.

Server 120 can connect to database 130, which can stores a variety of information including information the user is interested in accessing. While FIG. 1 illustrates one server 120, other embodiments can include multiple servers or a cloud configuration.

In accordance with various embodiments, computing devices 105A-105N may request data from one or more financial accounts stored on database 130, request financial quotes, personal account information, and/or other types of information or services stored on database 130 or server 120.

In accordance with some embodiments, server 120 may provide a variety of data access to computing devices 105A-105N. Examples of data access can include credit cards transaction history, bank account balances, confidential documents or confidential information, personal loan information, secured loan information, stock prices and quotes, interest rates, investment account information, equity lines of credit, insurance products, and other financial or investment information. For example, database 130 can include information such as total balance of all accounts held at the membership organization, credit ratings, home ownership information, annual salary, length of membership, account information, account numbers, and similar available financial or investment products.

In some embodiments, server 120 can be used to monitor accounts and information stored in database 130. Server 120 can include various data processing and analytic tools that allow for implementation, creation, and evaluation of customer or employee objectives relating to the customer's personalized financial situation and goals and customer's requests. In some embodiments, server 120 can be used to set individual requirements, rules, or objectives. In addition, server 120 may access one or more databases 130 having stored thereon budget information and/or information for individuals regarding financials or investments.

Server 120 may be implemented in distributed computing environments, where tasks or modules are performed by remote processing devices, which are linked through network 115. In a distributed computing environment, program modules or subroutines may be located in both local and remote memory storage devices. Distributed computing may be employed to load balance and/or aggregate resources for processing.

Database 130 may include various database components that can be implemented in the form of a database that is relational, sequential, hierarchical, scalable, and/or secure. Examples of such database include DB2, MySQL, Oracle, Sybase, and the like. Alternatively, these databases may be implemented using various standard data-structures, such as an array, hash, list, struct, structured text file (e.g., XML), table, and/or the like. Such data structures may be stored in memory and/or in structured files.

Figure 2:
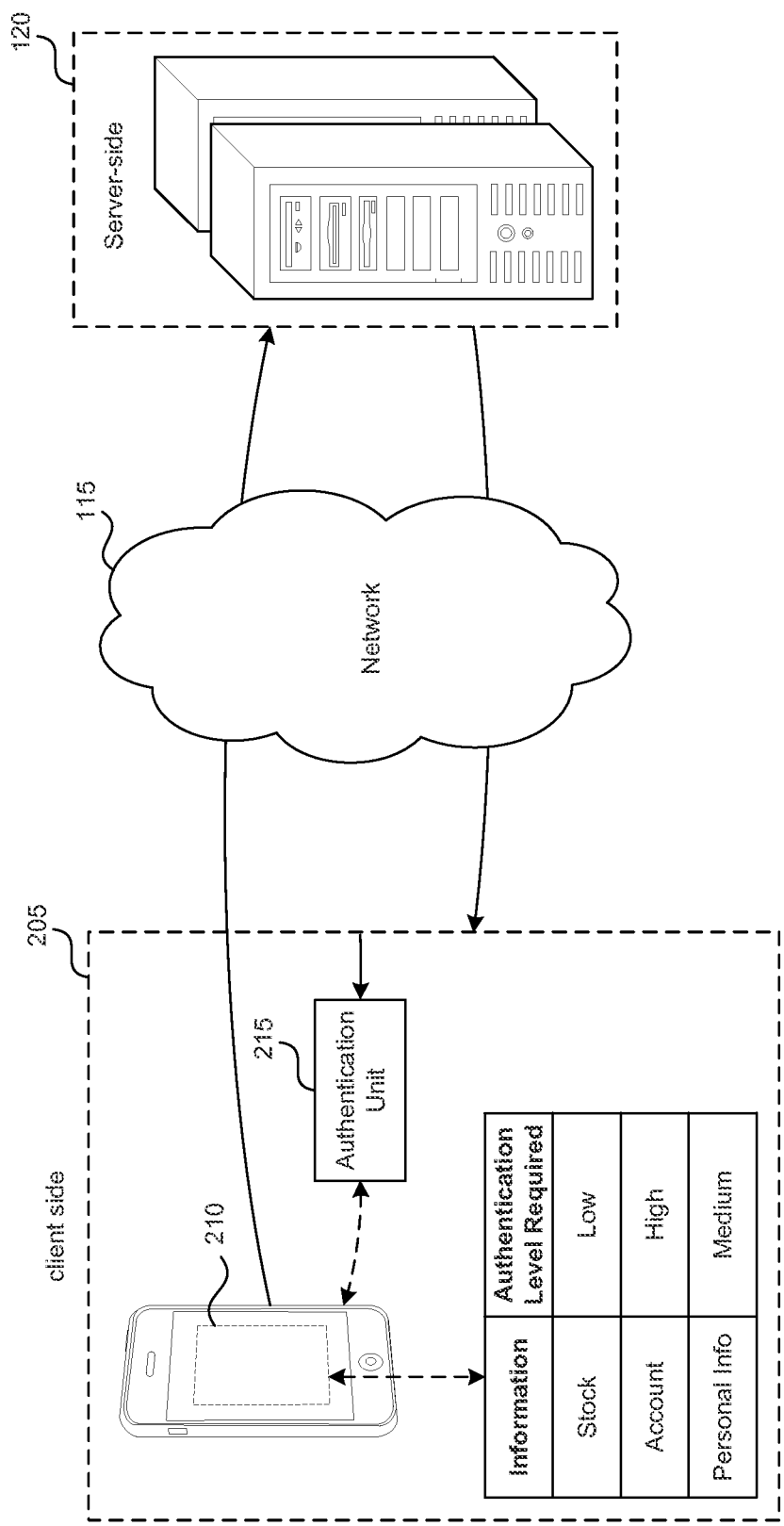
FIG. 2 illustrates an example of an authentication communication in which some embodiments of the present technology may be utilized.

FIG. 2 illustrates an example of an authentication communication in which some embodiments of the present technology may utilize a mobile application authentication infrastructure in accordance with various embodiments of the present technology. For example, a user on client side 205 may open up a mobile application on screen 210 and request to view certain information (e.g., stock price, account balance, and personal information) or access various services. The information (e.g., stock price, account balance, and personal information) may be stored on a server side infrastructure which may include server 120, resource coordinator 125 (not shown in FIG. 2), and database 130 (not shown in FIG. 2).

The information stored on the server may require varying levels of authentication (e.g., low authentication level for stock price and high authentication level for account balance). The client side may send a request over network 115 to the server side to access the information. Server 120 may respond with several authentication and non-authentication challenges. Once the responses are received at client side 205, authentication unit 215, which may be located inside the client's device, receives the responses and communicates with a client side computing device, for example, to update the user's screen 210. In some embodiments, authentication unit 215 may include a component to sort authentication challenges from non-authentication challenges, a component to generate a plan for how to respond to authentication challenges, a component to queue authentication challenges, and a component to prompt the user for input to answer authentication challenges.

Figure 3:
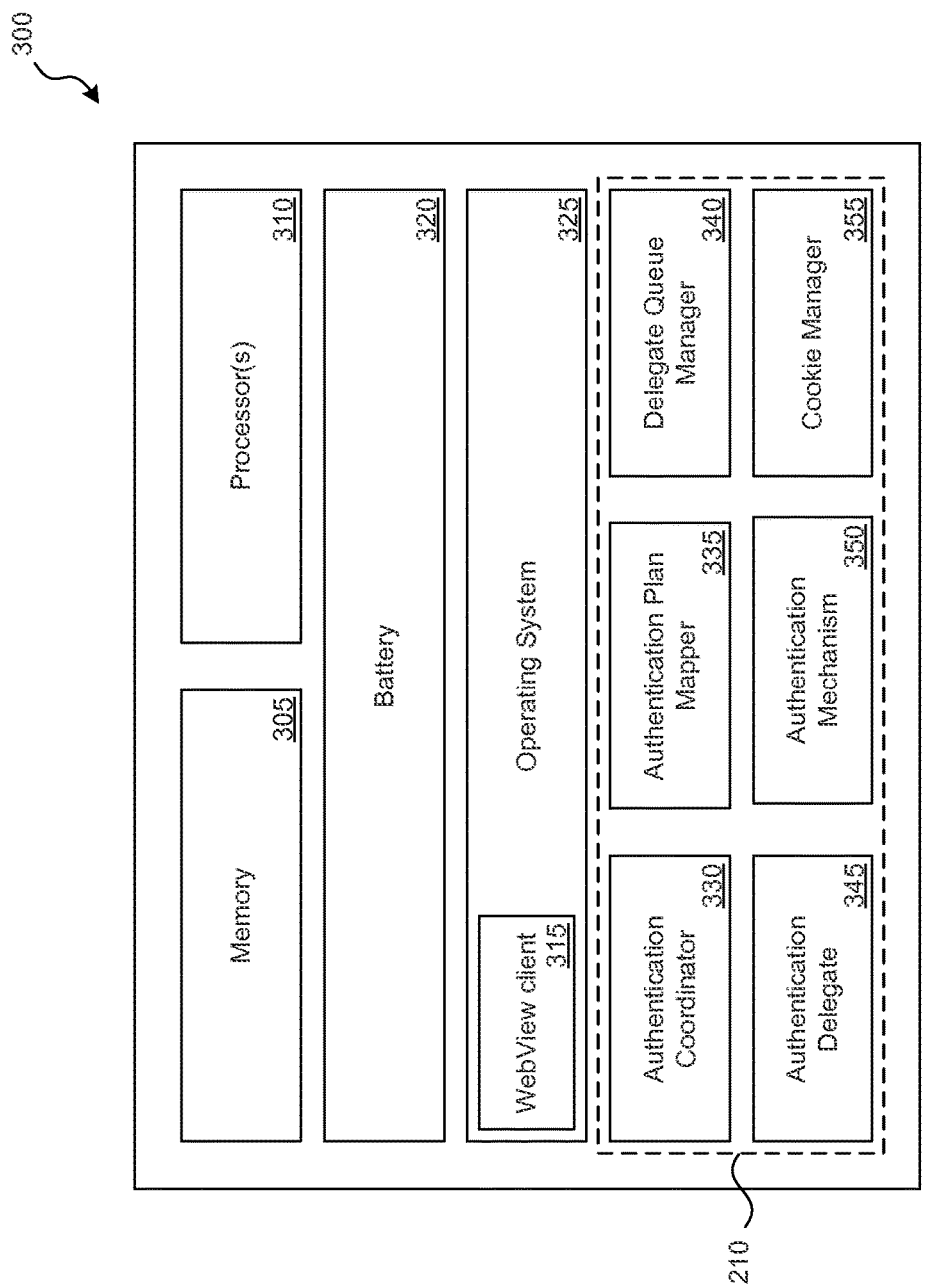
FIG. 3 illustrates a set of components for authentication that may be used in accordance with one or more embodiments of the present technology.

FIG. 3 illustrates a set of components 300 in a client side authentication infrastructure that may be used in accordance with one or more embodiments of the present technology. According to the embodiments shown in FIG. 3, computing devices 105A-105N can include a memory 305, one or more processors 310, a WebView client 315 (e.g., a web browser, application or program), battery 320, operating system 325, authentication coordinator 330, authentication plan mapper 335, delegate queue manager 340, authentication delegate 345, authentication mechanism 350, and cookie manager 355. Other embodiments of the present technology may include some, all, or none of these components along with other modules, applications, and/or components. Still yet, some embodiments may incorporate two or more of these modules and components into a single module and/or associate a portion of the functionality of one or more of these modules with a different module. For example, in one embodiment, authentication coordinator 330 and authentication plan mapper 335 can be combined into a single unit for evaluating and handling authentication challenges for the client.

Memory 305 can be any device, mechanism, or populated data structure used for storing information. In accordance with some embodiments of the present technology, memory 305 can encompass any type of, but is not limited to, volatile memory, nonvolatile memory and dynamic memory. For example, memory 305 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications, engines, analyzers, or modules on processor(s) 310. For example, memory 305 could be used in one or more embodiments to house all or some of the instructions needed to execute the functionality of WebView 315, authentication coordinator 330, authentication plan mapper 335, delegate queue manager 340, authentication delegate 345, authentication mechanism 350, and cookie manager 355.

Authentication delegate 345 can interpret and translate server-side communications. For example, a server 120 can send a communication to WebView 315. The communication (e.g., a packet with a header) can be a server requesting information from the client such as a password or username in response to user's request. Authentication delegate 345, which can be connected to WebView client 315, can receive the communication and interpret and translate the header for the packet and/or the information inside the packet. After interpreting and translating the header of the packet, the authentication delegate can forward the packet to the authentication coordinator 330.

Authentication coordinator 330 can receive responses and/or authentication challenges from server 120 over network 115. Authentication coordinator 330 can sort the received responses into authentication challenges and non-authentication challenges. For example, authentication coordinator 330 can receive an updated stock quote from server 120, which is not an authentication challenge, and an account balance, which includes an authentication challenge. Authentication coordinator 330 can then send the authentication challenges to authentication plan mapper 335, and the non-challenges to WebView client 315. Furthermore, authentication coordinator 330 can receive multiple responses, challenges or non-challenges, and in some embodiments it is connected to and can communicate with delegate queue manager 340.

In one embodiment of the present technology, authentication plan mapper 335 can determine a plan for how to answer/respond to authentication challenges on the client side infrastructure. Authentication plan mapper 335 can use a protocol, which incorporates several factors (e.g., device preferences, user preferences, level of authentication required, number of requests, desired response time, and the like) to create a customized authentication plan for responding to authentication challenges. In some embodiments, authentication plan mapper 335 can, for example, sort challenges based on highest or lowest level of authentication required, and then determine a plan for how to most efficiently (e.g., ask for user input the least number of times) address the challenges, which may involve only asking the user for one response and using stored information in memory 305 or user preferences stored in memory 305 to determine the plan.

Authentication plan mapper 335 can also determine if challenges can be queued and sent to delegate queue manager 340. In some embodiments, authentication plan mapper 335 can send the authentication plan directly to authentication coordinator 330, which can forward the queued messages to delegate queue manager 340. For example, if authentication plan mapper 335 receives a request for several usernames and passwords, a determination may be made that one username and password has the highest level of authentication and that username and password can answer several other authentication challenges (e.g., several bank accounts). Authentication plan mapper 335 can then create a plan for the response such as queuing several challenges and asking for user input to answer one challenge.

In accordance with various embodiments, delegate queue manager 340 can hold or queue authentication challenges (e.g., while one challenge is being answered by the user, another similar challenge may wait in the queue in order to not excessively ask the user for input, or the delegate can hold a challenge while authentication unit 210 is processing other challenges before sending the responses back to server 120, etc.). Delegate queue manager 340 can communication with authentication coordinator 330 to receive messages that can be queued or receive instructions to send a queued message to server 120.

Authentication delegate 345 can be connected to WebView client 315. In some embodiments, authentication delegate 345 communicates with authentication coordinator 330. Also, client side infrastructure 300 can include authentication mechanism 350 (e.g., a biometric device, a fingerprint scanner, a face recognition software, software, user-stored data, or like authentication mechanism) to be used in authentication unit 215 to respond to authentication challenges.

Cookie manager 355 can be used to view, edit, and create new cookies to assist in client-server communication. Cookie manager 355 may also allow editing multiple cookies at once, backing up/restoring properties, saving cookies, and other like options to manipulate cookies.

Figure 4A:
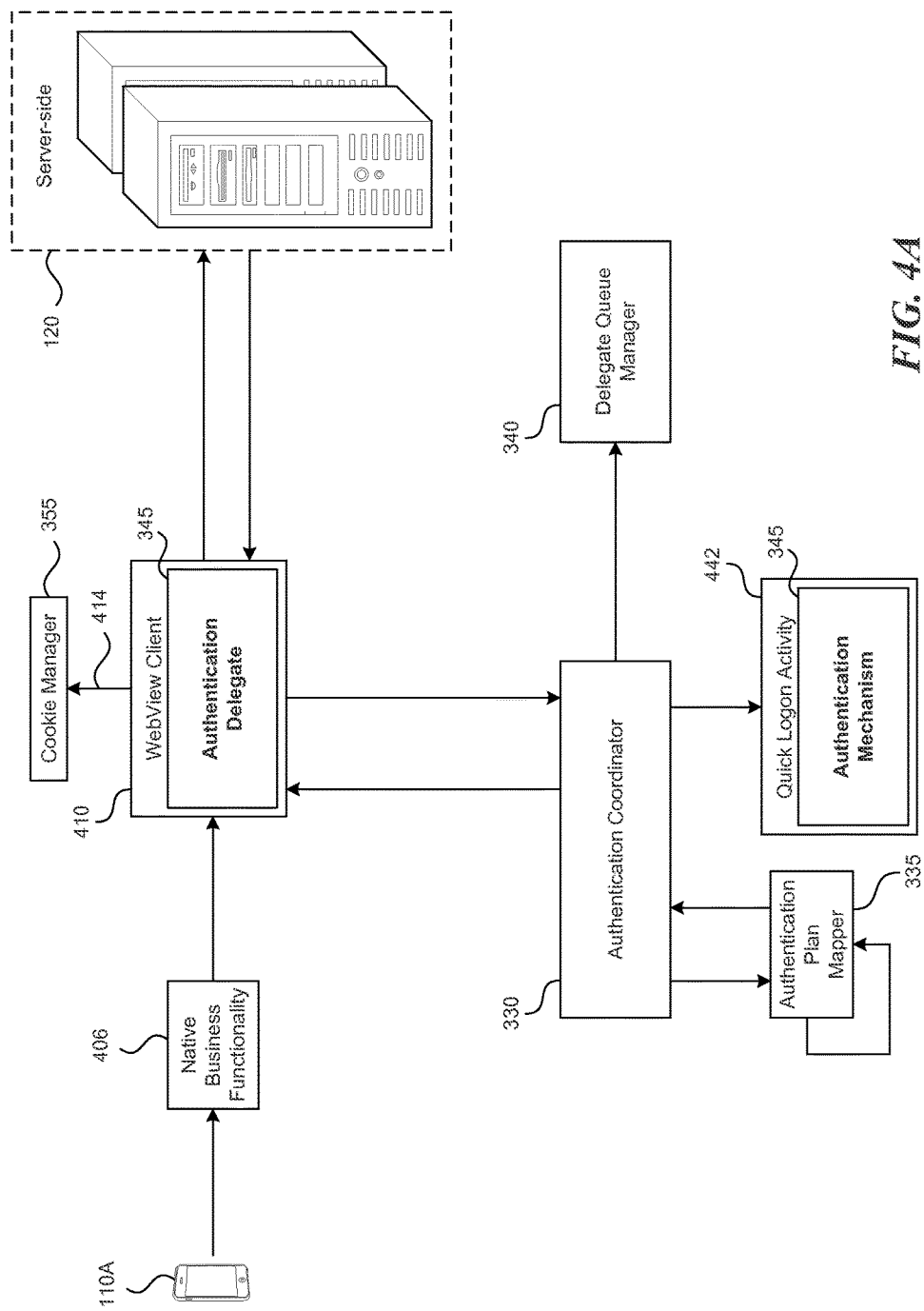
FIGS. 4A-4C are a flowchart illustrating an example of a set of operations for authentication in accordance with some embodiments of the present technology.
Figure 4B:
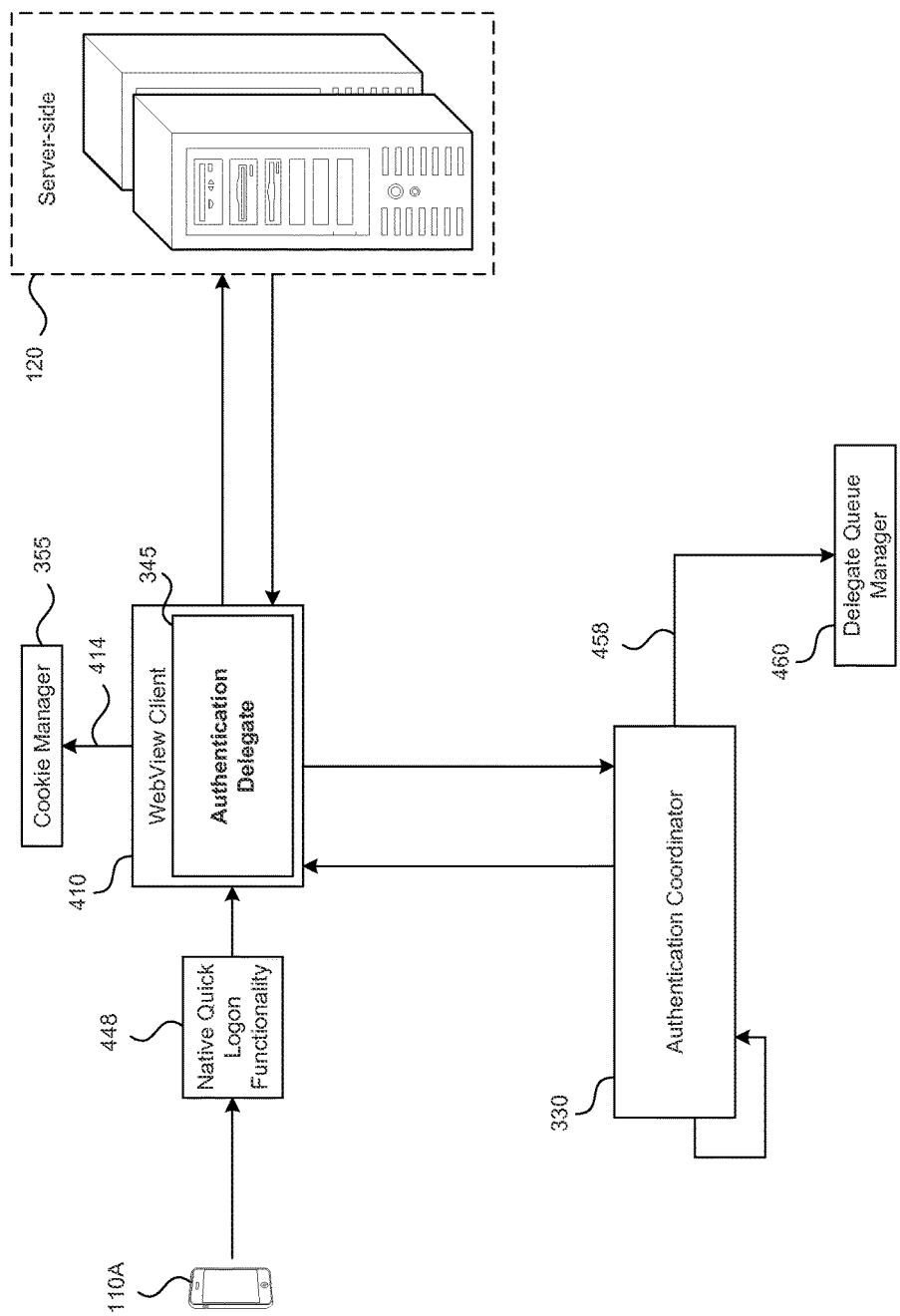
Figure 4C:
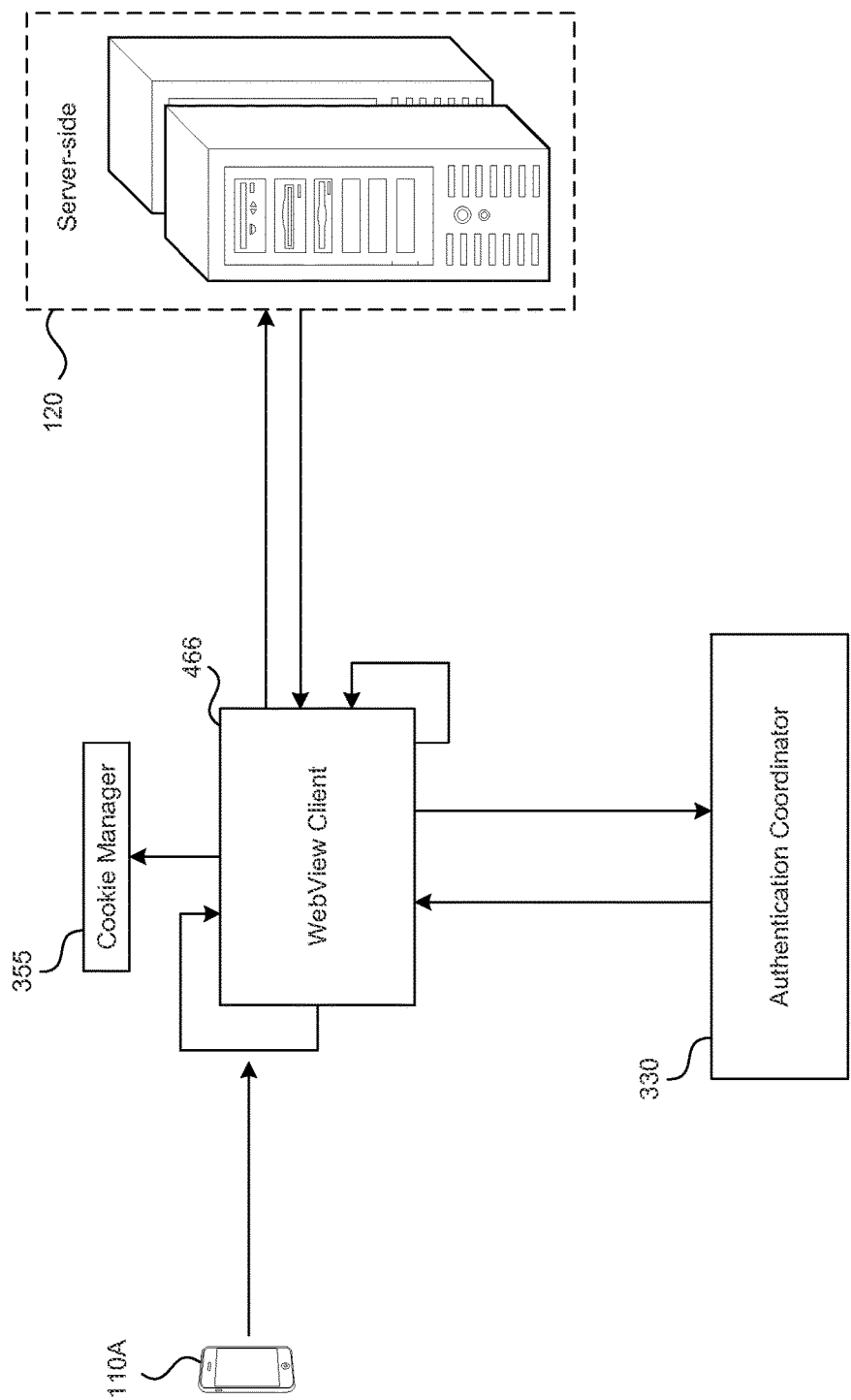

FIGS. 4A-4C are an example flowchart of one embodiment of the client side infrastructure that illustrates an example of a set of operations for authentication. For example, a user of computing device 110A can use an application. The user can open the application and can request certain information (for example, a stock price, account balance, or other personal information) within the application (or on a browser, etc.). This request can pass through native business functionality 406, a program that can be used to organize user requests or queries (e.g., a quick log on application). Then, the user's requests or queries can enter into WebView client 410, which can display and/or process webpages, and send requests (e.g., queries) to server 120.

Server 120 can then reply with responses, authentications challenges, and perhaps other requests. WebView client 410 will receive the response(s) and authentication delegate 345 will pass these responses to the authentication coordinator 330. Authentication coordinator 330 will determine which of the following responses is an authentication challenge (e.g., the username and password required for the user to see the account balance) or which is not authentication challenge (e.g., quote of stock price). Authentication coordinator 330 may use header information, message types, and other techniques for determining if a response is an authentication challenge or not.

Authentication challenges identified by authentication coordinator 330 can be sent to authentication plan mapper 335, which can prepare an authentication plan as described above. Responses that can be queued can be sent to delegate queue manager 340 via the authentication coordinator 330. The challenges that need to be answered by the client side infrastructure can enter Quick Logon Activity 442 (e.g., a software program that stores user identification or authentication information such as a fingerprint or facial profile), a client side authentication mechanism, which can use authentication mechanism 345 to answer the challenge or send the challenge to the user at point A.

FIG. 4B is similar to the embodiments in FIG. 4A, except in FIG. 4B the user has input an answer to the authentication challenge. The user input to the authentication challenge is directed to the authentication coordinator 330 via authentication mechanism delegate 450 in the WebView client 345. Because the user has input the answer to a challenge and other challenges have either been answered by the Quick Logon Activity 448 (in this embodiment there is a Quick Logon Activity, but it is not necessary, challenges can be sent directly to the user or queued) or queued in delegate queue manager 460 waiting for user input, the responses can be sent back to the server 120. For example, if the user input a username and password to receive account balance information, the other challenges for personal information related to the account may wait in the queue for this challenge answer. Because the username and password is a high level challenge, it can answer the lower level challenge of personal information. The client now can collect this information, account balance, from the server 120.

FIG. 4C is an example of when a user requests information that does not require an authentication challenge. For example, user device 110A requests some information from a server (e.g., a stock quote), and this request is sent to sever 120 via the WebView client 466. Server 120 will respond to the request with the stock quote, and it will not require an authentication challenge. Rather, the response will enter authentication delegate 345 (not shown) of WebView client 466, and authentication delegate will pass the response to authentication coordinator 330. Authentication coordinator 330 can determine the request is not a challenge and send the information directly to WebView client 466.

Figure 5:
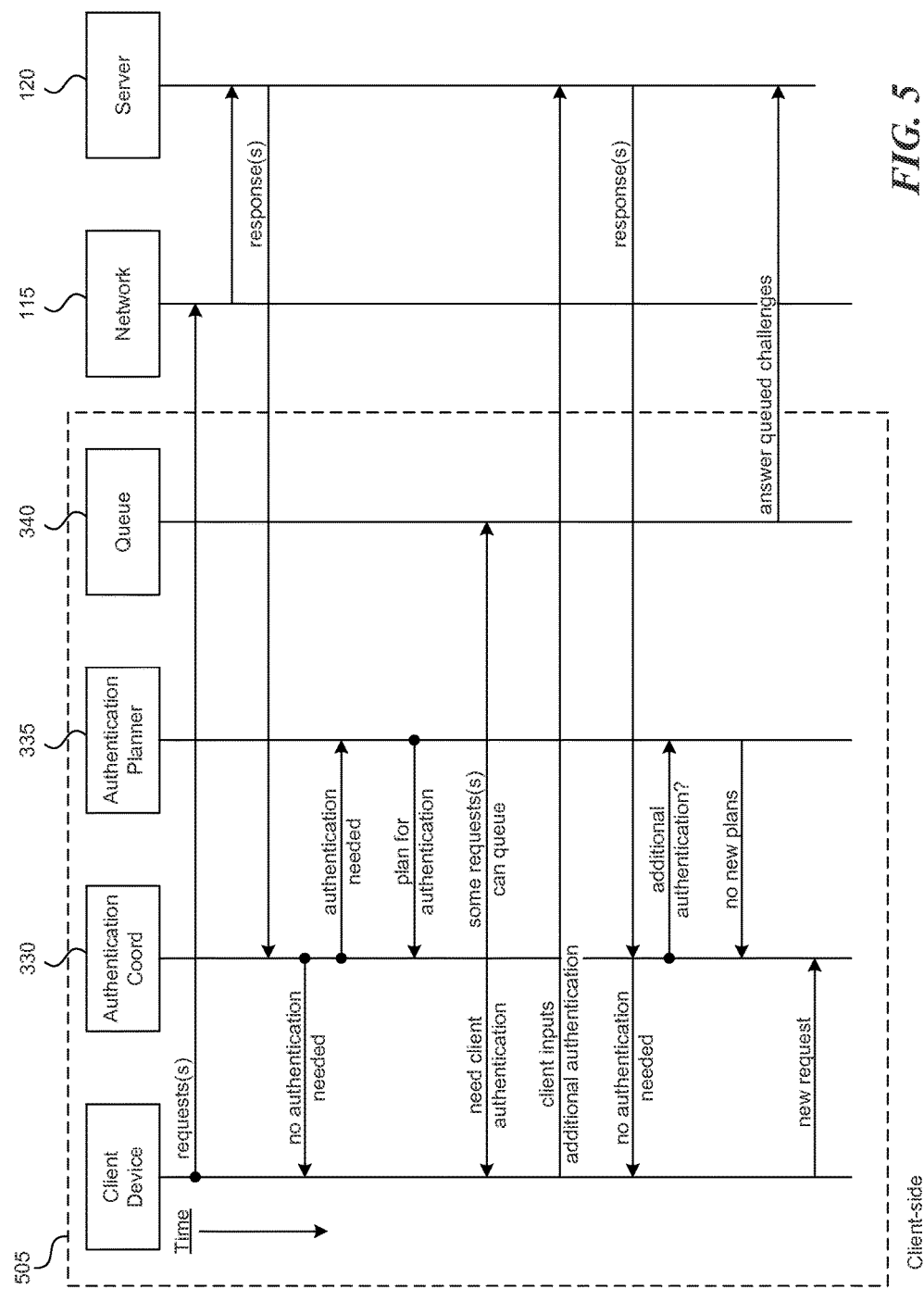
FIG. 5 is a sequence diagram illustrating communications between various components in accordance with various embodiments of the present technology.

FIG. 5 is a sequence diagram illustrating communications between various components in accordance with various embodiments of the present technology. As illustrated in FIG. 5, a user of a financial institution, for example, can request access to data or services (e.g., an evaluation and accounting of their financial situation) through the mobile application infrastructure. Upon receiving this request via network 115, server 120 can respond with authentication challenges or non-authentication challenges (responses). Authentication coordinator 330 can sort the responses into challenges and non-challenges, and send the non-challenges to the user (e.g., quotes related to the financial situations that do not require a secured response). Then, authentication planner 335 can create an authentication plan for the remaining challenges. For example, it may decide certain challenges can be queued in queue 340. The decision to queue or not queue a challenge can be determined by a protocol saved in memory 305 (not shown in FIG. 5).

The queued challenges can be answered after the client side queries the user for certain information or processes additional responses. Then, the user can input additional authentication information (e.g., information that is not already stored in the client or was not previously entered by the user) and the client can send this information to server 120. Server 120 can determine that the proper authentication information has been input by the user (or the client side infrastructure) and return the information the user originally requested. Once the user is properly authenticated, WebView will display an evaluation and accounting of their financial situation. The process of asking and receiving answers can be repeated.

Figure 6:
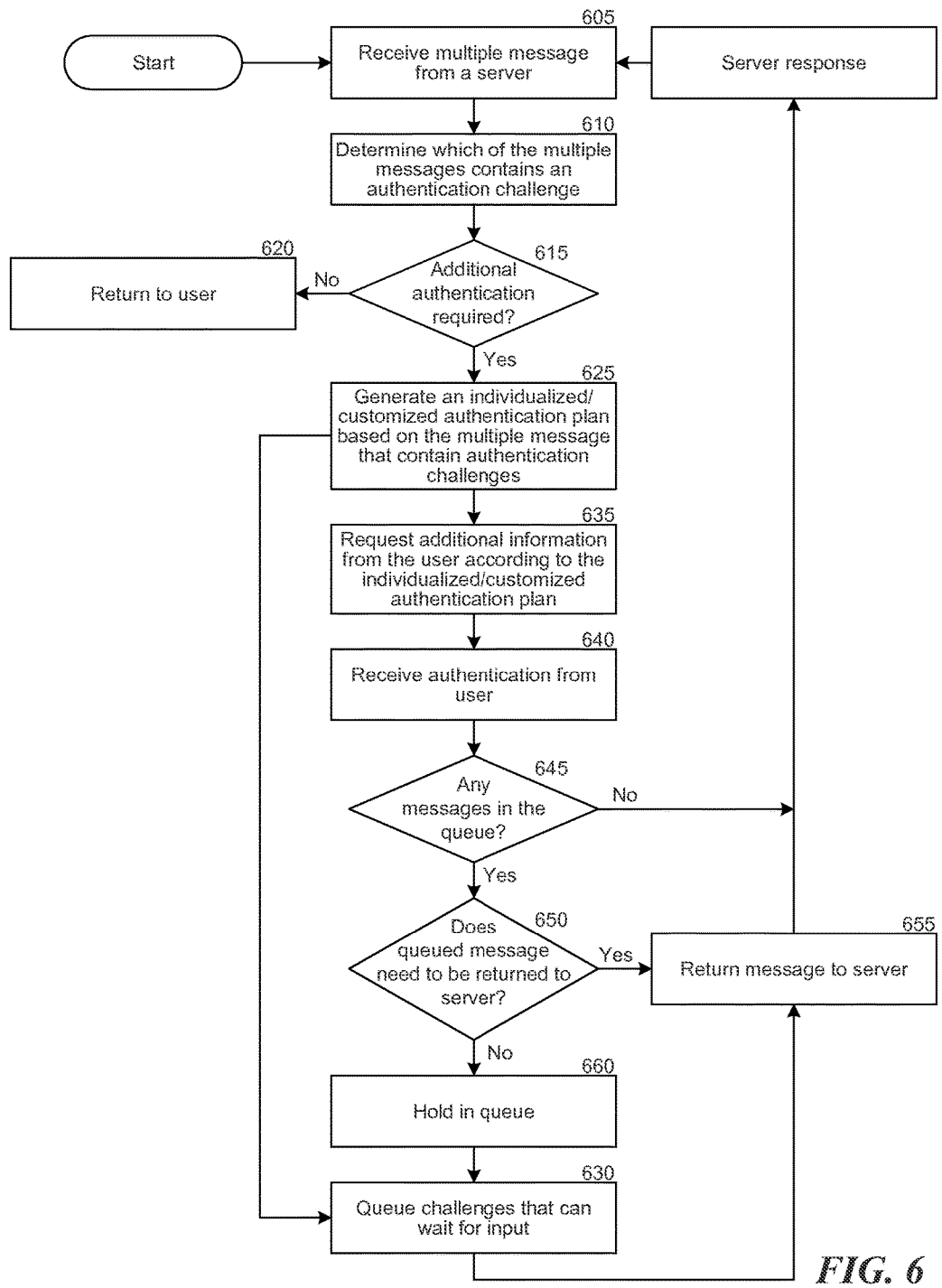
FIG. 6 is a flowchart illustrating an example of a set of operations for authentication in a client-server relationship in accordance with some embodiments of the present technology.

FIG. 6 is a flowchart illustrating a set of operations for communication with a server that can return authentication challenges in accordance with some embodiments of the present technology. The operations illustrated in FIG. 6 may be executed by a server 120, client device 105A, a memory 305, one or more processors 310, a WebView client 315 (e.g., a web browser, application or program), an authentication coordinator 330, an authentication plan mapper 335, a delegate queue manager 340, an authentication delegate 345, an authentication mechanism 350, and a cookie manager 355. These components are examples of various means for performing some of the operations illustrated in FIG. 6.

As illustrated in FIG. 6, receiving operation 605 receives multiple messages from a server in response to a user's requests. Determination operation 610 can then determine which of the multiple messages contains an authentication challenge. Decision operation 615 determines if additional authentication is required. If decision operation 615 determines that a message is not an authentication challenge, decision operation 615 branches to return operation 620 that returns the information within the message to the user. If decision operation 615 determines that a message is an authentication challenge, then decision operation 615 branches to generation operation 625 that generates an individualized/customized authentication plan based on the multiple messages.

In some embodiments, generation operation 625 may determine whether certain messages can be queued using queuing operation 630 according to a protocol. Then, request operation 635 will request additional information from the user or from another source on the client side according to the plan. For example, if several challenges were received and some challenges were low level authentication challenges and some challenges were high level authentication challenges, then generation operation 625 can generate an individualized/customized plan that includes queuing the low level authentication challenges and queuing operation 630 will queue the low level challenges.

In receiving operation 640, the infrastructure can receive authentication from user. Queuing determination operation 645 can determine whether there are any messages in the queue. If queuing determination operation 645 determines that there are no messages in the queue, a response will be sent to the server. The whole flowchart can start all over again if necessary (e.g., there are new authentication challenges).

If queuing determination operation 645 determines that there are messages in the queue, then queuing operation 645 branches to response determination operation 650 that will determine if any of the messages in the queue can now be responded to with the new user information using messaging operation 655 or if the messages should continue to be held in the queue using holding operation 660 and wait operations 650 and queuing operation 630.

Exemplary Computer System Overview

Figure 7:
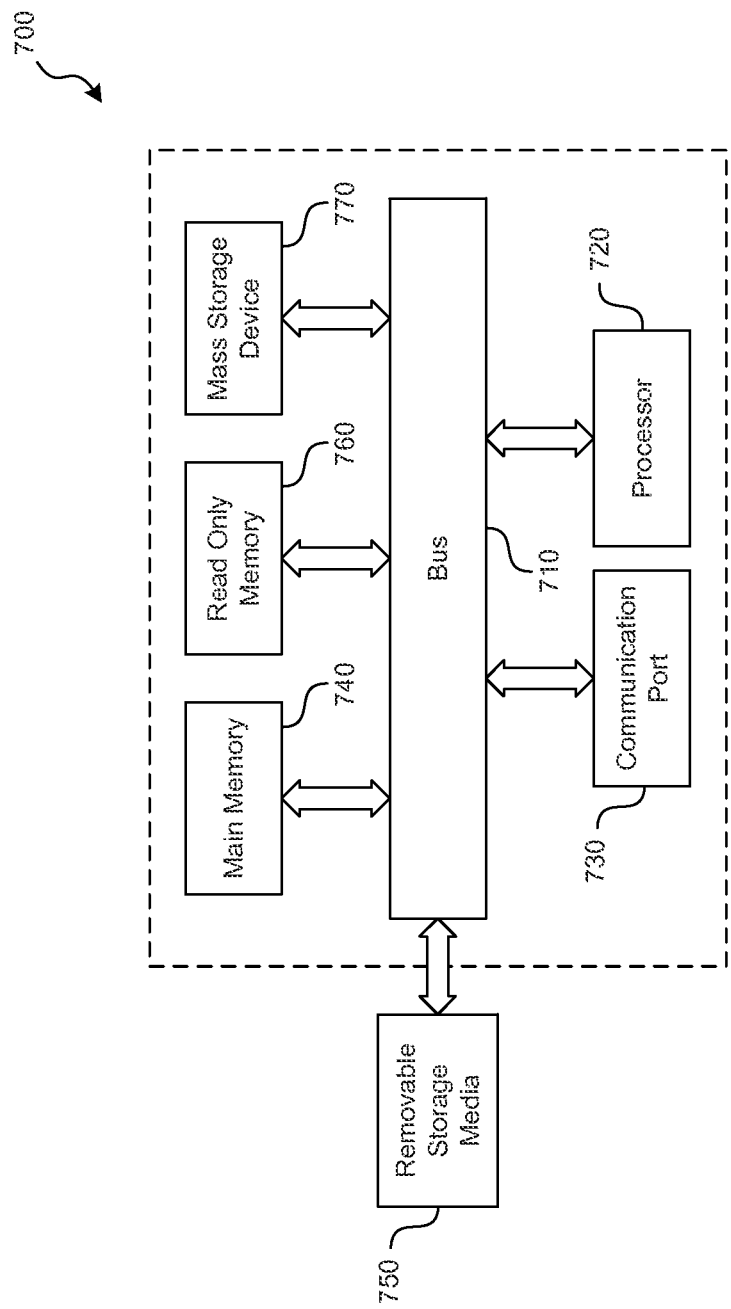
FIG. 7 illustrates an example of a computer system with which some embodiments of the present technology may be utilized.

Embodiments of the present technology include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present technology may be utilized. According to the present example, the computer system includes a bus 710, at least one processor 720, at least one communication port 730, main memory 740, a removable storage media 750, a read only memory 760, and a mass storage 770.

Processor(s) 720 can be any known processor, such as, but not limited to, Intel® lines of processor(s); AMD® lines of processor(s); or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen depending on a network such as a Local Area Network (LAN), Wide Area Network (WAN), or any network to which the computer system 700 connects.

Main memory 740 can be Random Access Memory (RAM) or any other dynamic storage device(s) commonly known in the art. Read only memory 760 can be any static storage device(s) such as Programmable Read Only Memory (PROM) chips for storing static information such as instructions for processor 720.

Mass storage 770 can be used to store information and instructions. For example, hard disks such as the Adaptec® family of SCSI drives, an optical disc, an array of disks such as RAID or such as the Adaptec family of RAID drives, or any other mass storage devices may be used.

Bus 710 communicatively couples processor(s) 720 with the other memory, storage and communication blocks. Bus 710 can be a PCI/PCI-X or SCSI-based system bus depending on the storage devices used.

Removable storage media 750 can be any kind of external hard-drives, floppy drives, (OMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the technology, as they are only exemplary embodiments.

The above Detailed Description of embodiments of the disclosure is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or sub-combinations. Each of these processes or blocks may be implemented in a variety of different ways. Also, while processes or blocks are at times shown as being performed in series, these processes or blocks may instead be performed or implemented in parallel, or may be performed at different times.

In conclusion, the present technology provides novel systems, methods and arrangements for a mobile application authentication infrastructure. While detailed descriptions of one or more embodiments of the technology have been given above, various alternatives, modifications, and equivalents will be apparent to those skilled in the art without varying from the spirit of the technology. For example, while the embodiments described above refer to particular features, the scope of this technology also includes embodiments having different combinations of features and embodiments that do not include all of the described features.

What is claimed is:

1. A computer-implemented method comprising:
   receiving, at network interface component of a computing device, communications from a server, wherein the communications include server-side information associated with multiple authentication challenges;
   identifying, by the computing device, the authentication challenges in the communications from the server;
   sorting the authentication challenges by a level of authentication required;
   prior to responding to the authentication challenges, creating, by a processor of the computing device, an authentication plan to satisfy the authentication challenges with a fewer number of communications than required for satisfying the authentication challenges without the authentication plan, wherein creating the authentication plan includes:
   accessing stored user information and user preferences related to responding to the authentication challenges,
   requesting the user to provide credentials in a single response to the authentication challenges,
      wherein the credentials associated with the single response satisfy a first level of authentication, and
   queuing one or more of the authentication challenges having the first level of authentication or a lower level of authentication required than the first level of authentication; and
   executing, by the computing device, the authentication plan to respond to the authentication challenges.

2. The computer-implemented method of claim 1, wherein creating the authentication plan includes comparing high level and low level authentication challenges to determine if responding to the high level authentication challenges will also respond to the low level authentication challenges.

3. The computer-implemented method of claim 1, wherein the authentication challenges are further sorted by whether the authentication challenges can be queued.

4. The computer-implemented method of claim 1, wherein creating the authentication plan includes comparing the authentication challenges with known user information on the computing device to identify authentication challenges that require additional user authentication.

5. The computer-implemented method of claim 1, further comprising
   prompting, through the computing device, a user for additional authentication information;
   receiving, through the computing device, the additional authentication information from user; and
   sending the acquired additional authentication information to the server.

6. The computer-implemented method of claim 1, wherein creating the authentication plan includes accessing a protocol to determine how to respond to the authentication challenges.

7. The computer-implemented method of claim 1, further comprising:
   comparing the authentication challenges with authentication information stored on a memory of the computing device; and
   prompting a user for additional authentication information including one or more of the following: a password, fingerprint, voiceprint, PIN, phone number, or email address.

8. The computer-implemented method in claim 1, wherein the authentication plan includes hold challenges in a queue that will wait for authentication information.

9. The computer-implemented method of claim 1, wherein receiving, at the network interface component of a computing device, communications from the server, comprises receiving communications from at least two servers.

10. The computer-implemented method of claim 1, wherein creating the authentication plan further includes sorting the authentication challenges by the user preferences.

11. A non-transitory machine-readable memory having stored thereon machine-executable instructions, that when executed by one or more processors, cause a client side-machine to:
   receive communications from a server, wherein the communications include server-side information associated with multiple authentication challenges;

identify the authentication challenges in the communications from the server;

sort the authentication challenges by a level of authentication required;

prior to responding to the authentication challenges, create an authentication plan to satisfy the authentication challenges with a fewer number of communications than required for satisfying the authentication challenges without the authentication plan, wherein creating the authentication plan includes:

accessing stored user information and user preferences related to responding to the authentication challenges, requesting the user to provide credentials in a single response to the authentication challenges, wherein the credentials associated with the single response satisfy a first level of authentication, and queuing one or more of the authentication challenges having the first level of authentication or a lower level of authentication required than the first level of authentication; and execute the authentication plan to respond to the authentication challenges.

12. The non-transitory, machine-readable memory of claim 11, wherein the machine-executable instructions that when executed by the one or more processors, cause the client-side machine to create the authentication plan, further cause the client-side machine to compare high level and low level authentication challenges to determine if responding to the high level authentication challenges will also respond to the low level authentication challenges.

13. The non-transitory, machine-readable memory of claim 11, wherein the authentication challenges are further sorted by whether the authentication challenges can be queued.

14. The non-transitory, machine-readable memory of claim 11, wherein the machine-executable instructions that when executed by the one or more processors cause the client-side machine to create the authentication plan, further cause the client-side machine to compare the authentication challenges with known user information on the computing device to identify authentication challenges that require additional user authentication.

15. The non-transitory, machine-readable memory of claim 11, wherein the machine-executable instructions, when executed by the one or more processors, further cause the client-side machine to:

prompt a user for additional authentication information;

receive the additional authentication information from user; and send the acquired additional authentication information to the server.

16. The non-transitory, machine-readable memory of claim 11, wherein the machine-executable instructions that when executed by the one or more processors cause the client-side machine to create the authentication plan, further cause the client-side machine to access a protocol to determine how to respond to the authentication challenges.

17. The non-transitory, machine-readable memory of claim 11, wherein the authentication plan includes hold challenges in a queue that will wait for authentication information.

18. The non-transitory, machine-readable memory of claim 11, wherein creating the authentication plan further includes sorting the authentication challenges by the user preferences.

19. A system comprising:

a memory;

a processor in communication with the memory, the processor operable to execute software modules, the software modules comprising:

an authentication delegate coupled to the processor to interpret and translate server-side communications, wherein the communications include server-side information associated with multiple authentication challenges;

an authentication coordinator configured to coordinate interactions with server driven communications, wherein coordinating interactions comprises:

identify the authentication challenges in the communications from the server, and sort the authentication challenges by a level of authentication required;

an authentication plan mapper configured to:

prior to responding to the authentication challenges, create an authentication plan to satisfy the authentication challenges with a fewer number of communications than required for satisfying the authentication challenges without the authentication plan, wherein creating the authentication plan includes:

accessing stored user information and user preferences related to responding to the authentication challenges, requesting the user to provide credentials in a single response to the authentication challenges, wherein the credentials associated with the single response satisfy a first level of authentication, and queuing one or more of the authentication challenges having the first level of authentication or a lower level of authentication required than the first level of authentication; and execute the authentication plan.

20. The system of claim 19 wherein the authentication plan mapper is further configured to select one or more authentication challenges to be queued and one or more authentication challenges to be immediately answered.

21. The system of claim 19, wherein the authentication plan mapper is further configured to determine the authentication plan based on one or more of the following factors: whether the authentication can be queued while the user responds to another authentication challenge, previously known authentication information stored in the memory, and previous user responses to authentication challenges.

22. The system of claim 19, wherein creating the authentication plan further includes sorting the authentication challenges by the user preferences.

* * * * *